(12) United States Patent
Kovacs, Jr.

(10) Patent No.: US 7,857,007 B2
(45) Date of Patent: Dec. 28, 2010

(54) TWO-PART PROTECTOR FOR A PIPE END WHICH IS PROVIDED WITH AN EXTERNAL OR INTERNAL THREAD

(75) Inventor: George A. Kovacs, Jr., Ebstorf (DE)

(73) Assignee: Thread Guard Technology Ltd., Gibraltar (GI)

( * ) Notice: Subject to any disclaimer, the term of this patent is extended or adjusted under 35 U.S.C. 154(b) by 267 days.

(21) Appl. No.: 12/092,029

(22) PCT Filed: Dec. 9, 2005

(86) PCT No.: PCT/EP2005/013181

§ 371 (c)(1),
(2), (4) Date: Apr. 29, 2008

(87) PCT Pub. No.: WO2007/057047

PCT Pub. Date: May 24, 2007

(65) Prior Publication Data

US 2008/0222843 A1 Sep. 18, 2008

(30) Foreign Application Priority Data

Nov. 15, 2005 (DE) .................. 10 2005 054 815

(51) Int. Cl.
*F16L 55/10* (2006.01)
*B65D 59/06* (2006.01)
(52) U.S. Cl. .................. 138/96 T; 138/89; 215/217

(58) Field of Classification Search ............... 138/96 T; 215/217–220, 318
See application file for complete search history.

(56) References Cited

U.S. PATENT DOCUMENTS

| 4,157,100 | A | | 6/1979 | Turk |
| 4,337,799 | A | * | 7/1982 | Hoover .................. 138/96 T |
| 4,487,228 | A | * | 12/1984 | Waldo et al. ............ 138/96 T |
| 4,655,256 | A | | 4/1987 | Lasota et al. |
| 4,957,141 | A | * | 9/1990 | Dreyfuss et al. ........... 138/89 |
| 5,195,562 | A | * | 3/1993 | Dreyfuss et al. ......... 138/96 T |

FOREIGN PATENT DOCUMENTS

| EP | 0128575 A | 12/1984 |
| EP | 0297493 A | 1/1989 |

* cited by examiner

*Primary Examiner*—Patrick F Brinson
(74) *Attorney, Agent, or Firm*—Gudrun E. Huckett

(57) ABSTRACT

A two-part protector for a pipe end provided with an external thread or internal thread has a substantially cylindrical thread part of plastic material that covers the thread of the pipe end and further has a sleeve of metal that is also substantially cylindrical and supports the threaded part rearwardly. The threaded part and the sleeve engage one another lockingly by locking projections and locking cutouts. The sleeve, with a terminal edge that is leading when realizing the locking action, is pressed at least near the locking recesses tightly against the threaded part.

11 Claims, 8 Drawing Sheets

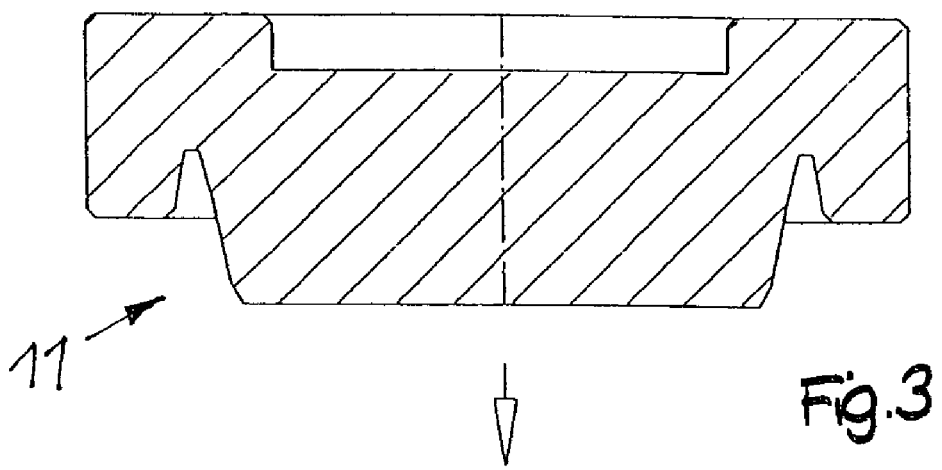
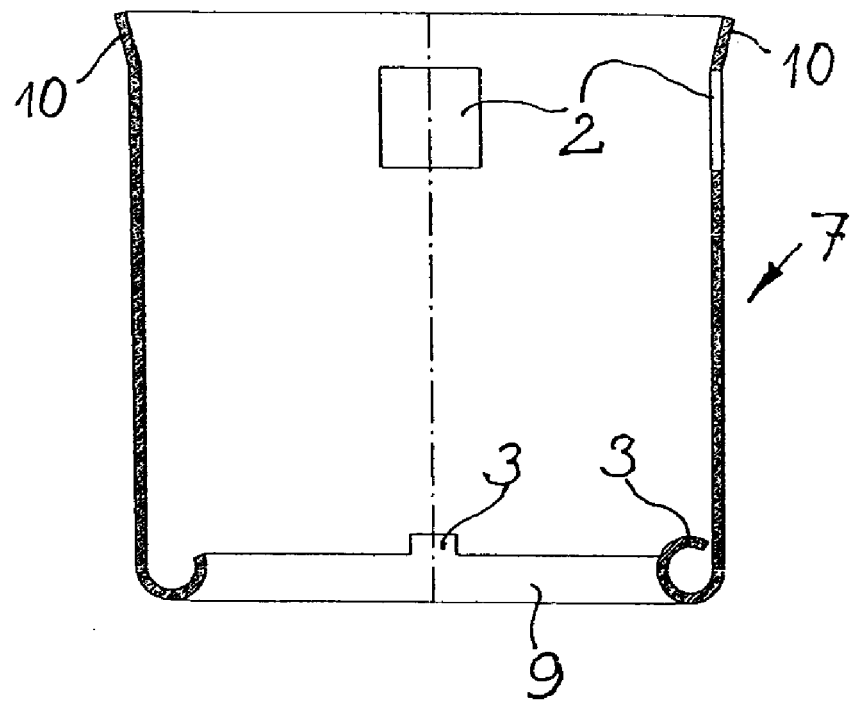
Fig.3
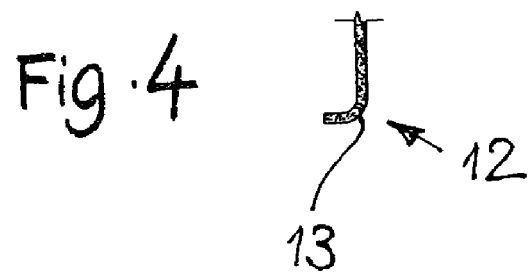
Fig.4

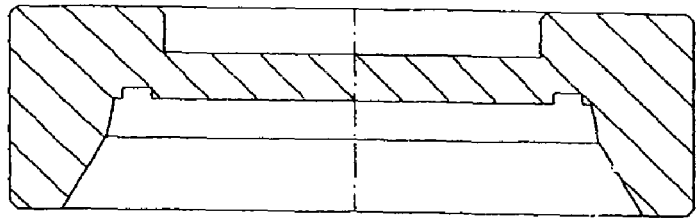
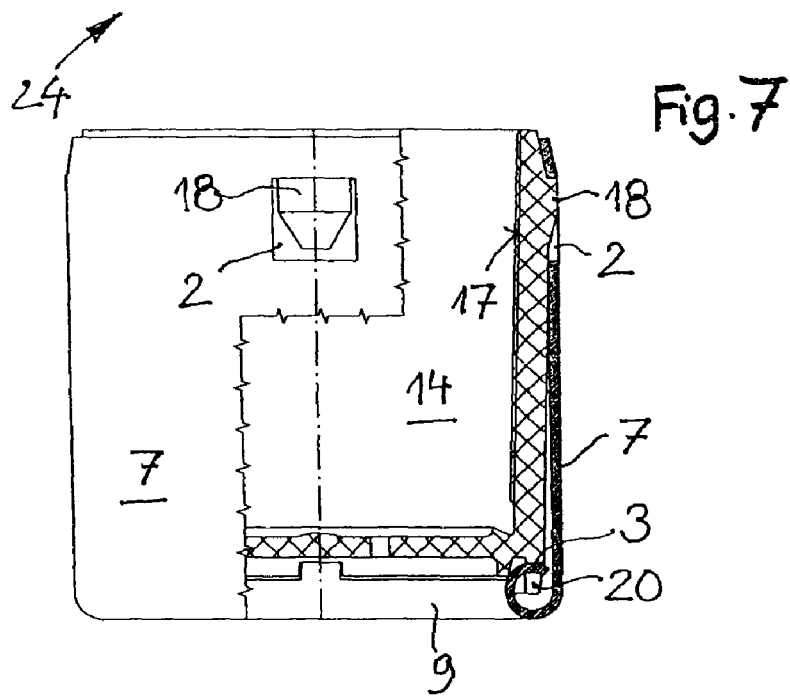
Fig. 7
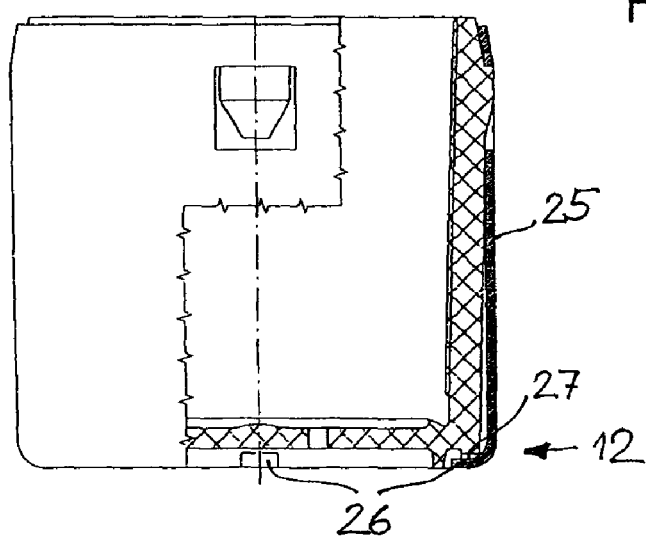
Fig. 8

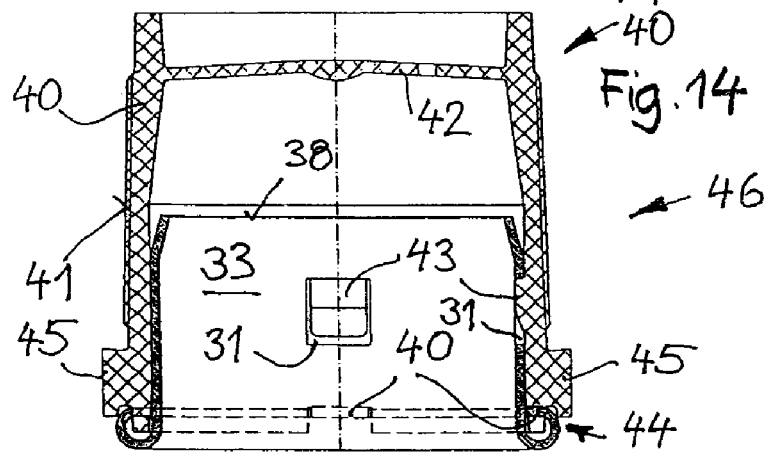

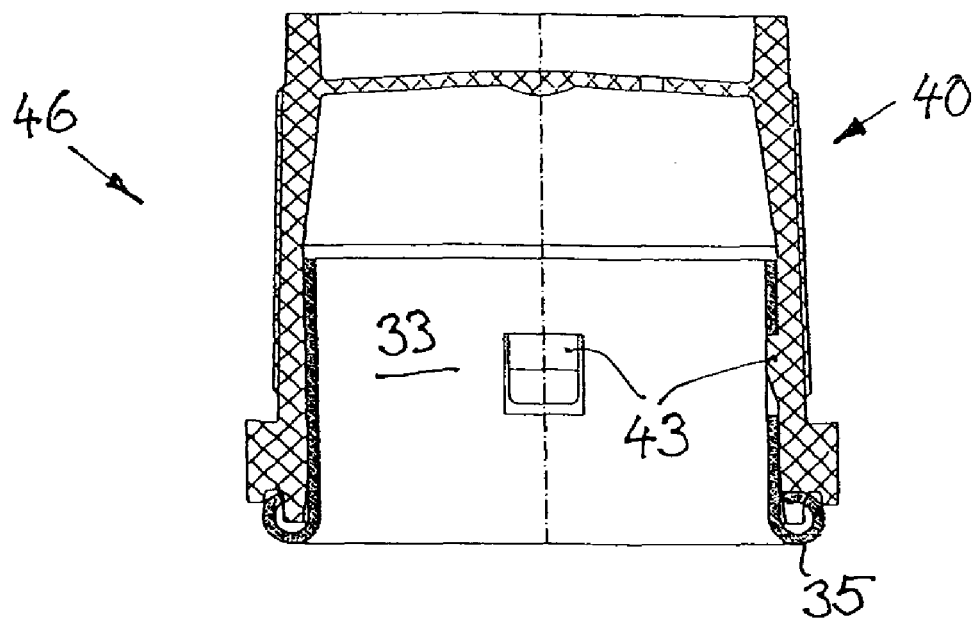
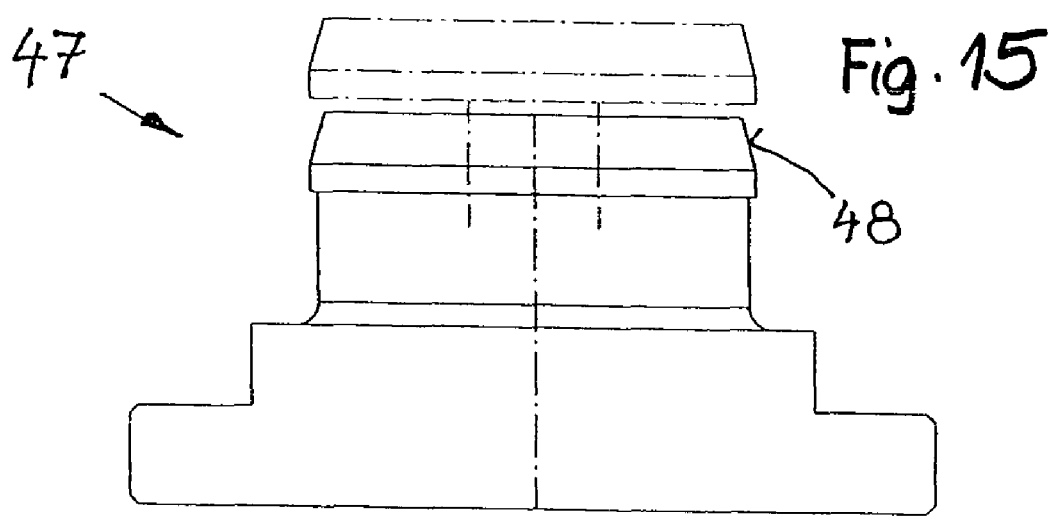
Fig. 15

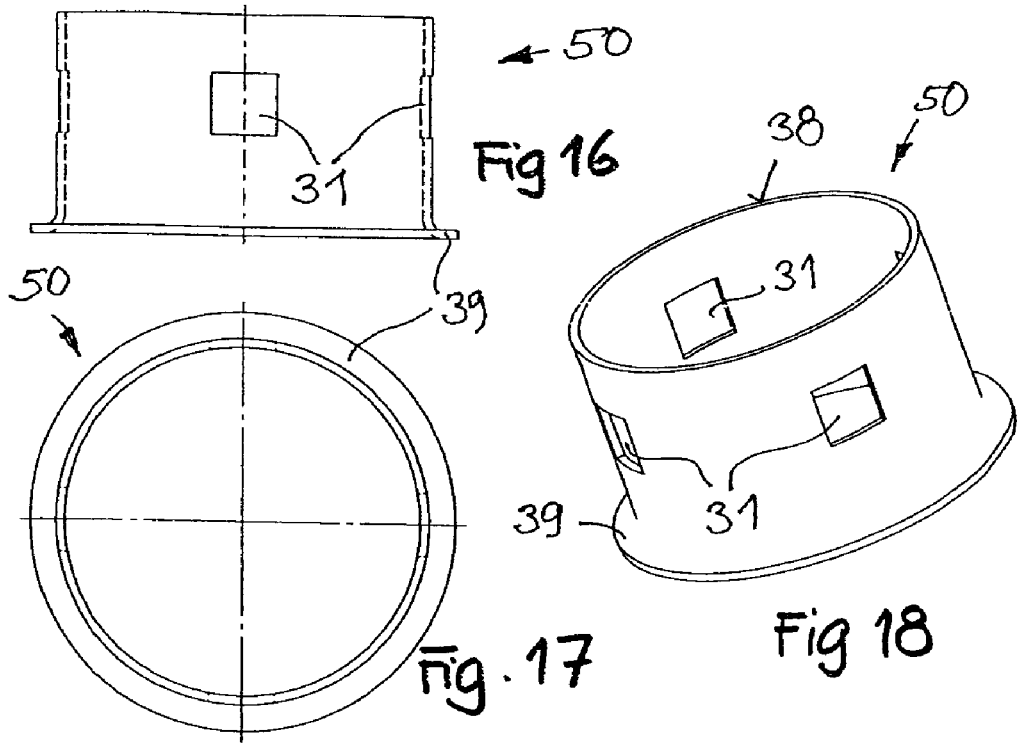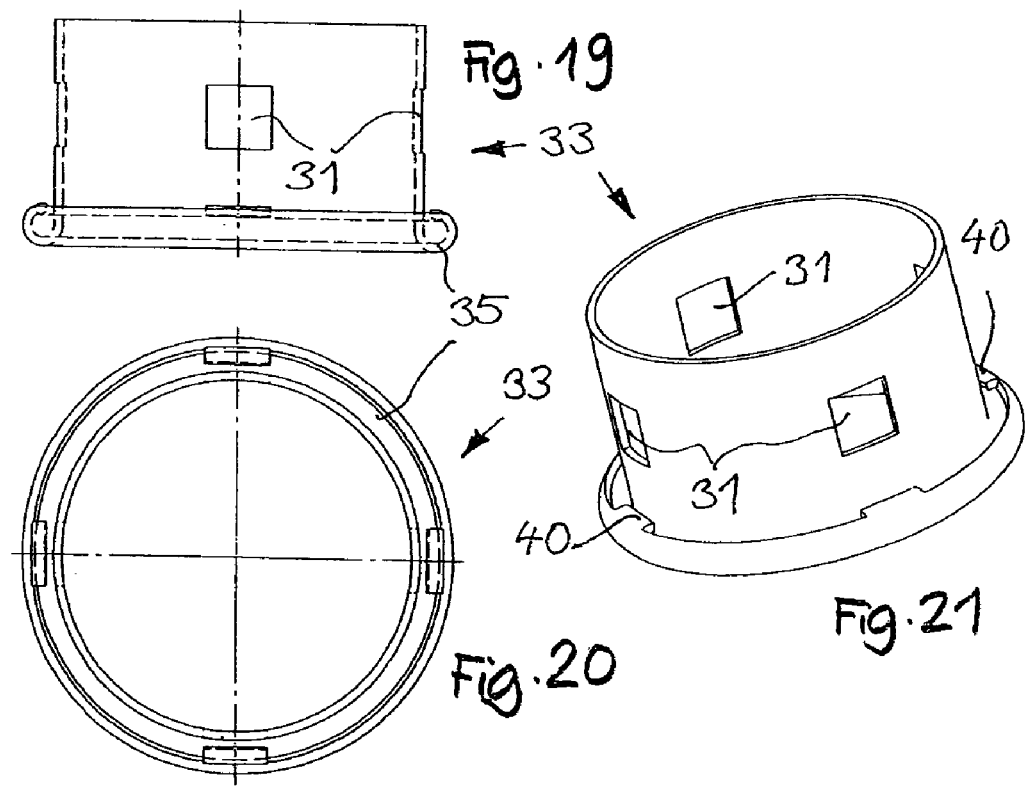

TWO-PART PROTECTOR FOR A PIPE END WHICH IS PROVIDED WITH AN EXTERNAL OR INTERNAL THREAD

BACKGROUND OF THE INVENTION

The invention concerns a two-part protector for a pipe end provided with an external thread or internal thread, wherein a substantially cylindrical thread part of plastic material covers the thread of the pipe end and a sleeve of metal that is also substantially cylindrical supports the threaded part rearwardly and wherein the threaded part and the sleeve engage one another lockingly by locking projections and locking cutouts. The invention concerns moreover a method for producing such a protector. Such protectors are used in particular for transporting and storing pipes with threads and other sensitive couplings at the pipe ends. Primarily, pipes for drill strings are to be protected with respect to tough manipulation and storage conditions at their sensitive thread areas. The threads can be external threads but also, for example, in case of the ends of socket pipes, internal threads. Both must be protected from damage, deformations, and soiling.

As an immediate cover of such a threads primarily threaded parts of plastic material are suitable that, with regard to their manufacture, can be easily adjusted to different threads and primarily in case of impacts at the ends are less hard and also less strong compared to the threads of the pipes so that they absorb loads and do not transmit them onto the threaded part. This is an immediate protective thread cover. However, in order for such protectors to be able to withstand also severe loads, such protectors are often additionally provided with a cylindrical sleeve of metal, preferably steel, that for protecting an external thread are arranged so as to surround the threaded part of plastic material or, for protecting an internal thread, cover the internal side of the threaded part of plastic material. In both cases the threaded part with its leading end (thread side) contacts the thread and at its rear is supported by the metal sleeve. Both parts of the protector are coupled lockingly in a well-known way. However, in this connection the problem is often encountered that the much harder and stronger metal sleeve damages integrally formed locking projections on the threaded parts. As a result of this and also because of precautionary tolerances in regard to the seat of the locking means there is the risk that the sleeve relative to the threaded part will become detached or as a result of movement play during transport damage is caused on the threaded part made of plastics. The locking seat between sleeve and threaded part must be ensured even under extreme temperatures wherein in particular the different thermal expansion of metal (steel) and plastic material (threaded part) especially causes difficulties. Problems with the proper locking seat between threaded part and sleeve also have an effect on the possibility of unscrewing the protector from the thread or screwing it again onto the thread when the screwing action is realized through the metal sleeve.

Object of the invention is therefore to provide a two-part protector where the sleeve and the threaded part can be plugged into one another fixedly and with little play without the threaded part becoming damaged in the process and in which also an excellent connection between sleeve and threaded part ensures a problem-free manipulation when screwing on or unscrewing it, even in case of use under extreme temperature conditions.

SUMMARY OF THE INVENTION

According to the invention this object is solved by a two-part protector of the aforementioned kind in that the sleeve, with a terminal edge that is leading when realizing the locking action, is pressed at least near the locking recesses tightly against the threaded part.

Especially in the area of the locking recesses it is important that the sleeve rests tightly against the threaded part in order to prevent any detaching movement and also to provide an excellent seat when rotary movements are performed. This is achieved preferably in that the sleeve is first pushed on with a slanted terminal edge and then is subsequently shaped behind the locking recesses so as to be in tight contact.

It is understood that the area of locking recesses in this regard is particularly important so that the tight contact can be limited to circumferential areas near the locking means. In general, the fight contact is provided uniformity about the entire leading terminal edge in order to avoid even local play or locally freely projecting edges.

It is particularly advantageous when the sleeve is cup-shaped which provides by means of a bottom of the cup a closure of the pipe opening, prevents engagement of coarse tools such as lifting tools, and can be produced easily with regard to manufacturing technology even for injection-molded plastic parts.

The sleeve can have at its end that is trailing when realizing the locking action a rolled edge that engages across the rear edge of the threaded part and thus also provides an edge protection. Moreover, interlocking can be provided at the rolled edge in order to provide an anti-rotation securing means that secures the threaded part and the sleeve relative to one another in the rotational direction and prevents loading of the locking projections and locking recesses when the protector is loaded rotationally so that the locking means remain free of load.

The corresponding deformation of the terminal edge can be realized with the method according to the invention by means of a shaping die that is preferably cylindrical. Also, the sleeve can be designed at the trailing end with projections that, upon forming to produce the rolled edge, serve as interlocking means by engaging receptacles in the threaded part.

BRIEF DESCRIPTION OF THE DRAWINGS

Embodiments of the invention are illustrated in the drawing and will be explained in the following in more detail. The drawing shows in.

DESCRIPTION OF PREFERRED EMBODIMENTS

Figure 1:
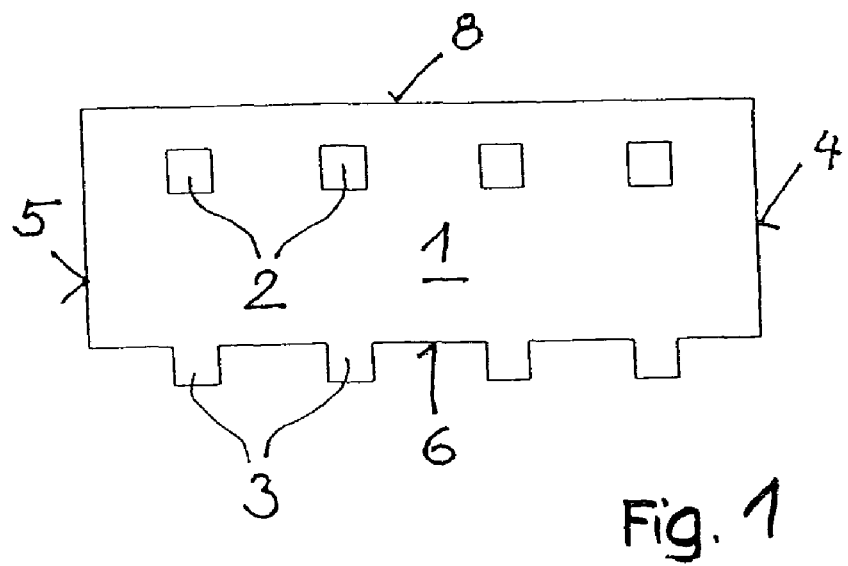
FIG. 1 a stamped sheet metal for producing a metal sleeve for a protector,
FIG. 2 a metal sleeve for a protector for an external thread,
FIG. 3 metal sleeve according to FIG. 2 with shaping tool,
FIG. 4 a modified embodiment of the metal sleeve of FIGS. 2 and 3 with modified rolled edge,
FIG. 5 a threaded part of a protector,
FIG. 6 a protector with threaded part and metal sleeve,
FIG. 7 protector according to FIG. 6 with a shaping tool,
FIG. 8 another embodiment of a protector,
FIG. 9 a stamped sheet metal for producing a metal sleeve for a protector for an internal thread,
FIG. 10 metal sleeve for a protector for an internal thread,
FIG. 11 protector according to FIG. 10 with shaping tool,
FIG. 12 detail of a metal sleeve of a further embodiment,
FIG. 13 threaded part for a protector for an internal thread, FIG. 14 protector for an internal thread, FIG. 15 protector according to FIG. 14 with a shaping tool, FIGS. 16, 17 and 18 views of a metal sleeve for a protector for an internal thread, FIGS. 19, 20 and 21 a further embodiment of a metal sleeve for a protector for an internal thread.

A stamped sheet metal 1 of steel identified in FIG. 1 of substantially rectangular contour has inwardly positioned cutouts 2 and downwardly projecting projections 3. Such a stamped sheet metal is bent transversely to its length to a ring and butt-welded at the abutting edges 4, 5 and rolled inwardly at the bottom edge 6 so that a sleeve 7 according to FIG. 2 results. The sleeve is initially cylindrical at the terminal edge 8 neighboring the cutouts in accordance with the remainder of the sleeve. A rolled edge 9 formed on the opposite end continues its curved shape into the projections 3.

Figure 2:
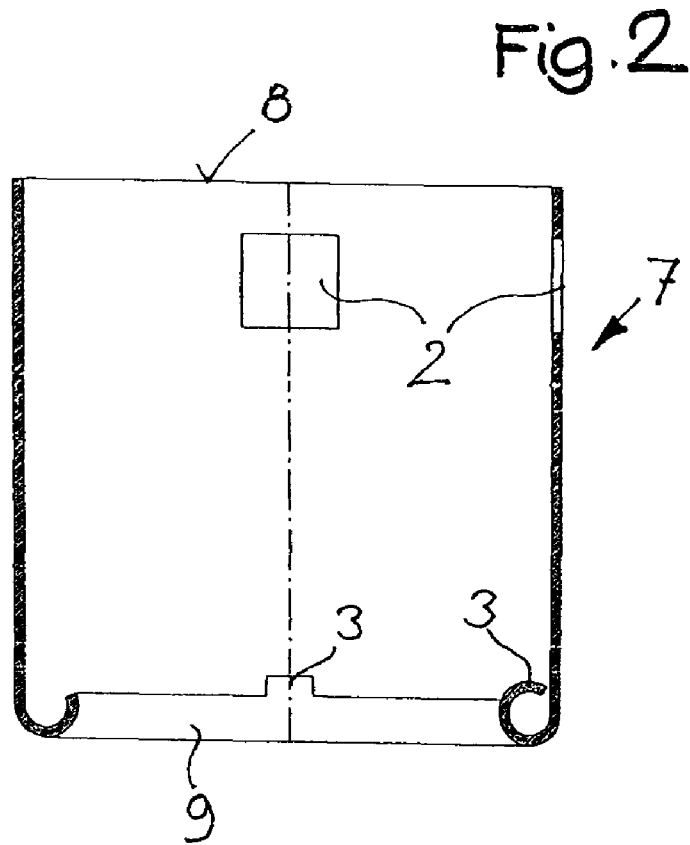

It should be noted that FIG. 2 does not show a (symmetric) diametral section of the sleeve but in one half a developed section plane. Indeed, the four cutouts 2 and also the projections 3 are distributed uniformly about the circumference at a circumferential angle of 90°, respectively, relative to one another, wherein the section line of the illustration is however not placed on the left side of FIG. 2 through a cutout 2 and a projection but instead adjacent thereto.

In FIG. 3 a further shaping of the sleeve 7 is illustrated; the sleeve is provided between the cutouts 2 and the leading terminal edge 8 with a conical widened section 10 by means of a die-like cylindrical shaping tool 11 that is forced axially from above into the sleeve and widens the terminal edge 8.

The rolled edge 9 remains unchanged in the process. In FIG. 4 an alternative rolled edge 12 is illustrated for a sleeve that otherwise corresponds to the sleeve 7; this sleeve has a reduced deformation and can be produced more easily. However, like the rolled edge 9 it provides a circumferentially extending rounded edge 13 for a robust sleeve that is configured to be impact-proof with regard to axial as well as radial loads. The rolled edge 12 can be provided with projections that correspond to the projections 3.

Figure 5:
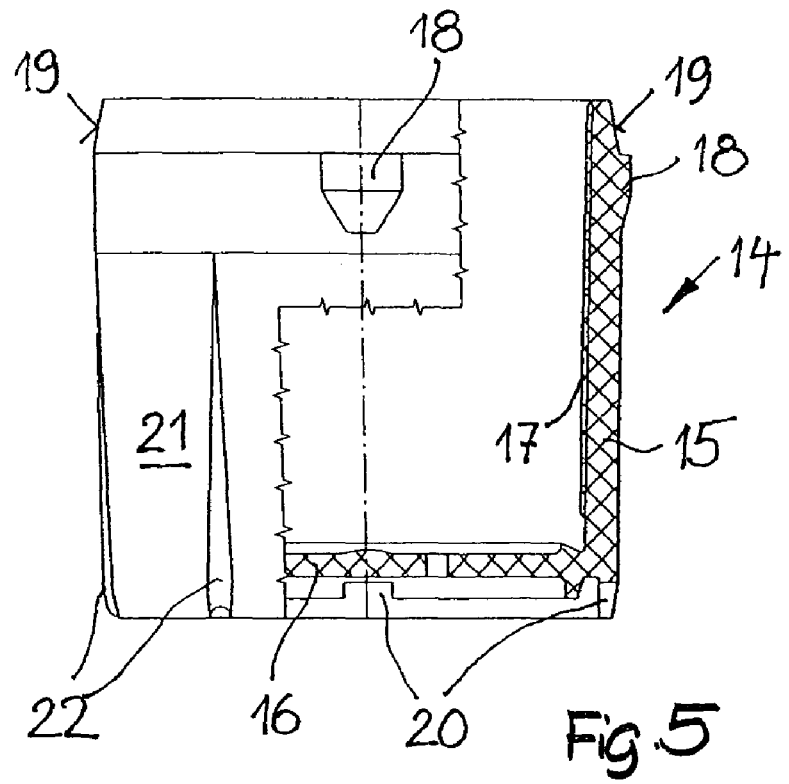

In FIG. 5, the threaded part 14 of plastic material to match the sleeve 7 is illustrated; it is configured with a cylindrical wall 15 and a bottom 16 in a cup shape in order to cover a pipe end radially as well as axially. It is provided on an internal circumferential wall 17 with a cut thread that is to be screwed onto an external thread of a pipe to be protected. The threaded part has projections 18 that match the cutouts 2 of the sleeve 7. At the upper edge above the projections 18 a circumferentially extending rim 19 is formed that conically tapers toward the end. Moreover, receptacles 20 are formed in the threaded part, produced by an injection-molding process, and are designed for engagement by the projections 3.

The threaded part 14 with regard to its external shape is slightly conical so that it tapers slightly toward the edge that is neighboring the receptacles 20; this is beneficial for easy removal from the mold in injection molding processing. On a correspondingly slightly conical external wall surface 21, longitudinal ribs 22 are however formed that, with their external edges, cancel the conical shape and define a cylindrical external envelope for receiving the cylindrical sleeve. The ribs 22 moreover provide a handling means for a situation where the threaded part 14 is to be used as a single-part protector without sleeve. In this case, the ribs 22 are positioned externally and serve as an attack structure for screwing on or unscrewing the protector by hand or with tools.

Figure 6:
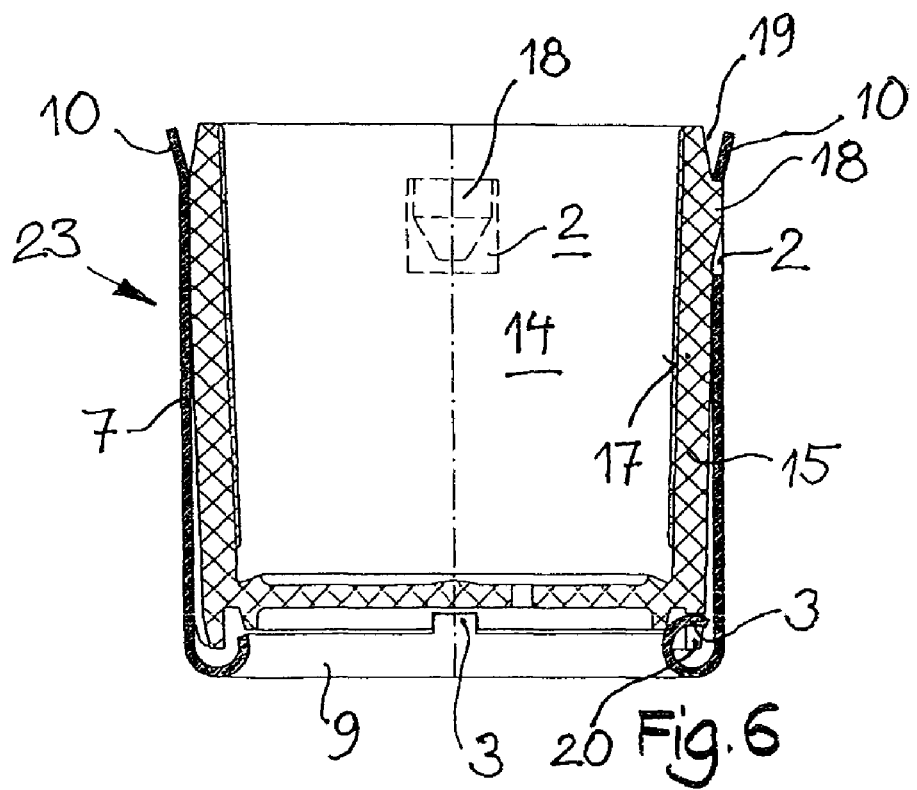

In FIG. 6 a two-part protector 23 is illustrated that is comprised of the threaded part 14 and a sleeve 7. By coaxial insertion wherein the sleeve glides without play along the external edges of the ribs 22, the leading terminal edge 8 of the sleeve 7 has also passed with its forwardly widening shape the locking projections 18 that, in turn, are provided with slanted ramp surfaces. The projections 3 of the sleeve have also reached the matching receptacles of the threaded part 14. As shown in the drawing, the projections 3 have within the receptacles in the circumferential direction a reduced play in comparison to the play of the locking projections 18 in the cutouts 2 so that the threaded part 14 when rotating the sleeve 7 is entrained only by the projections 3 while the locking projections 18 are not loaded.

A very important final shaping process by means of a tool 24, designed, like the tool 11, as a cylindrical die but acting by radial compression from the exterior, causes shaping of the edge 10 of the sleeve 7 to tightly contact the conical area 19 of the threaded part 14 so that the external edge is pushed in; especially, the sleeve 7 and the threaded part 14 rest against one another without play wherein also the locking means ensure a more stable connection by a firmer engagement of the locking projections 18 at the edges of the locking recesses. In this regard, especially important for this deformation is the tight contact of the sleeve 7 near the locking cutouts 2.

FIG. 8 shows an embodiment of a protector as an alternative to that of FIG. 7 whose sleeve 25 is embodied in accordance with sleeve 7 but has at its trailing end only a 90° rolled structure according to the rolled edge 12 of FIG. 4. This embodiment can also be designed with an anti-rotation securing means in the form of projections 26 and receptacles 27 without loading the locking means.

In FIGS. 9 to 21 protectors for internal threads are illustrated as counter parts to the protectors for external threads according to FIGS. 1 to 8.

Figure 9:
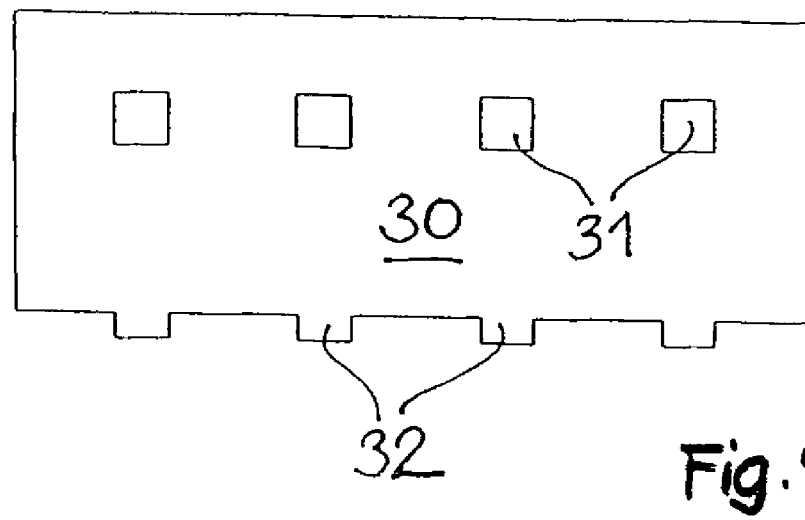
Figure 10:
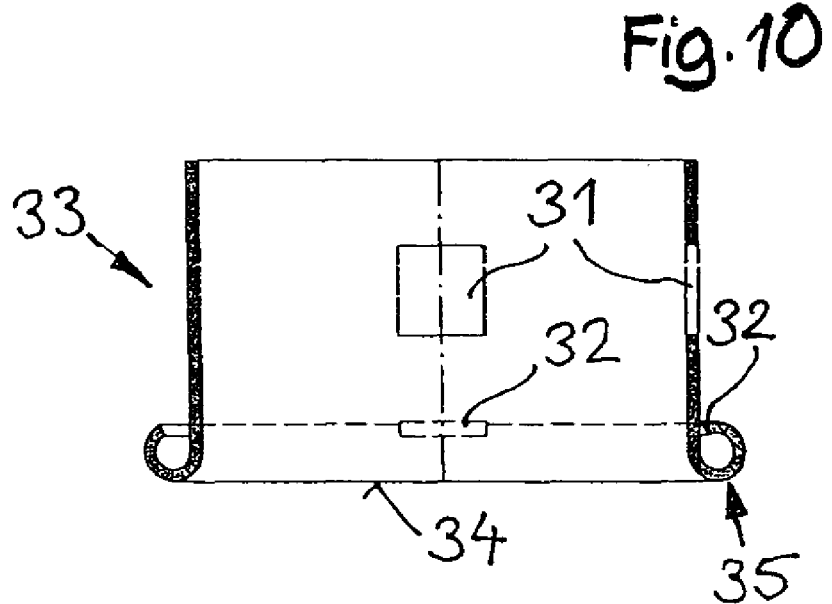

In FIG. 9 an elongate rectangular stamped sheet metal 30 is illustrated as a preproduct and has cutouts 31 for locking and projections 32 for designing an anti-rotation interlocking means and, according to FIG. 10, can be bent to a ring shape and welded so that a sleeve 33 is formed that has locking cutouts 31 uniformly distributed in the circumferential direction and at its rear edge 34 is provided with a rolled edge 35, wherein the rolled edge, in contrast to the afore described embodiment of sleeve 7, is shaped to extend outwardly. This sleeve 33 that is cylindrical with the exception of the rolled edge is shaped by means of an axially advanced die-like and substantially cylindrical shaping tool 36 by means of conical shaping surfaces 37 along a leading terminal edge 38 so as to taper forwardly.

FIG. 12 illustrates in detail a simplified shape of a rolled edge 39 with less curving that is oriented flange-like outwardly but can still have projections serving for interlocking.

The threaded part 40 matching the sleeve 33 is illustrated in FIG. 13. This threaded part has an external surface that tapers slightly conically in the upward direction and has thread 41 cut into it. The threaded part 40 is completed to a cup shape by means of a bottom 42. On the one hand, on the internal side locking projections 43 with slanted ramp surfaces are provided at the leading side for insertion into a sleeve and, on the other hand, receptacles 44 for locking and meshing with the sleeve 33 are provided; they are shown in section in FIG. 14. The rolled edge 35 of the sleeve 33 covers an outwardly projecting terminal area 45 of the threaded part 40 that serves, when screwing on the threaded part, as a point of attack for a hand or a tool but also provides protection with regard to impacts. In this embodiment, the receptacles 44 are also configured relative to the projections 32 with minimal oversize in the circumferential direction in comparison to the locking projections 43 relative to the locking recesses 31. This protects the locking means upon rotational loads on the sleeve from damage and stress. As shown in FIG. 14, the leading edge 38 of the sleeve with the adjoining conical area, that has been helpful and gentle with regard to the locking action when inserting sleeve and threaded part into one another, now projects in a way that would appear to cause play or enable the sleeve to drop out when the sleeve is contacted by a tool in case the protector identified by 46 is subjected to tough use.

This is counteracted according to FIG. 15 by means of a die-like tool 47 whose conical head part 40 penetrates into the sleeve and reshapes the leading edge to a cylindrical shape so that the leading edge will contact fixedly and tightly the internal wall of the threaded part 40 and securely engages the locking projections 43. It is understood that by means of a multi-part tool also a spreading movement going beyond this is possible that widens the sleeve at the leading edge 38 to a cone shape that is in even tighter contact.

FIGS. 16, 17, and 18 show in different views a sleeve with a rolled edge 39 in accordance with FIG. 12 that is thus only widened to a flange and that, in the present case, also has no projections. In case of flat contacting of a sleeve on a threaded part such projections are not necessary because in such an embodiment attack possibilities for introducing torque through the sleeve 50 are hardly possible.

A preferred sleeve according to FIGS. 19 to 21 is illustrated by sleeve 33 that provides an excellent protection of the threaded part as well as an anti-rotation connection between sleeve and threaded part without causing loading of the locking means with a rolled edge 35 that as such is bent by more than 180° and with regard to the projections bent even farther.

The illustrated embodiments of protectors for external and internal threads are robust and moreover can be produced in an extremely simple way even though the materials to be joined with regard to strength, hardness, and in particular also their thermal expansion coefficients are very different. Especially the thermal expansion of the materials of different magnitude entails the risk of disassembly of two-part protectors when this is not counteracted by special measures by way of shaping the sleeve onto the threaded part in the leading terminal edge area and by way of interlocking means preventing rotational movements.

What is claimed is:

1. Method for producing a two-part protector (23, 43), the method comprising the steps of:
    manufacturing a cylindrical sleeve (7, 33) of metal with locking cutouts (2, 31) and a terminal edge;
    injection-molding from plastic material a threaded part (14, 40) with locking projections;
    coaxially moving the cylindrical sleeve (7, 33) and the threaded part (14, 40) into each other with the terminal edge facing the threaded part until locking relative to one another occurs by engagement of the locking projections in the locking cutouts,
    deforming and tightly pressing the terminal edge of the cylindrical part against the threaded part (14, 40) so as to tightly contact the threaded part.

2. Method according to claim 1, further comprising the step the shaping the terminal edge before the locking action is realized by means of an axially supplied shaping die (11, 36) to provide the terminal edge with a slant relative to the threaded part.

3. Method according to claim 1 for producing a protector (23) for an external thread, wherein the step of deforming and tightly pressing of the terminal edge after the locking action is realized by means of a shaping die (24) pushed onto the sleeve positioned externally on the threaded part.

4. Method according to claim 1, comprising the steps of providing the sleeve (7, 33) at a trailing edge with projections (3, 32) and shaping the trailing edge to a rolled edge (9, 35), on which the projections (3, 32) are facing the threaded part (14, 40) for the purpose of interlocking.

5. Method according to claim 4, comprising the step of providing receptacles (20, 44) in the threaded part and the step of interlocking the projections (3, 32) at the trailing edge and the receptacles of the threaded part to provide an anti-rotation securing means.

6. Method according to claim 4, wherein the rolled edge is shaped as an arc of at least 90°.

7. Method according to claim 5, wherein the locking projections (18, 43) and the locking cutouts (2, 31) are provided with greater play relative to one another in the circumferential direction than the projections (3, 32) and receptacles (20, 44) of the anti-rotation securing means.

8. Method according to claim 1, wherein the locking projections (18, 43) form a slanted ramp surface for the cylindrical sleeve during locking.

9. Method according to claim 1, wherein the threaded part is provided with a terminal rotary flange that projects outwardly past a thread area of the threaded part.

10. Method according to claim 1, wherein the threaded part is provided with an external surface with longitudinal ribs.

11. Method according to claim 1 for producing a protector (23) for an internal thread, wherein the step of deforming and tightly pressing the terminal edge after the locking action is realized by means of a shaping tool (47) pushed into the sleeve positioned inside the threaded part.

\* \* \* \* \*